United States Patent
Cam Winget et al.

(10) Patent No.: US 7,558,960 B2
(45) Date of Patent: Jul. 7, 2009

(54) NETWORK INFRASTRUCTURE VALIDATION OF NETWORK MANAGEMENT FRAMES

(75) Inventors: Nancy Cam Winget, Mountain View, CA (US); Mark Krishcer, Pymble (AU); Timothy Olson, San Jose, CA (US); Pauline Shuen, Palo Alto, CA (US); Ajit Sanzgiri, Los Gatos, CA (US); Sheausong Yang, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 238 days.

(21) Appl. No.: 11/029,987

(22) Filed: Jan. 5, 2005

(65) Prior Publication Data
US 2005/0141498 A1 Jun. 30, 2005

Related U.S. Application Data

(63) Continuation-in-part of application No. 10/687,075, filed on Oct. 16, 2003.

(51) Int. Cl.
*H04L 9/00* (2006.01)
(52) U.S. Cl. .................... 713/176; 713/160
(58) Field of Classification Search .......... None
See application file for complete search history.

(56) References Cited

U.S. PATENT DOCUMENTS

| | | | | |
|---|---|---|---|---|
| 6,965,674 | B2* | 11/2005 | Whelan et al. | 380/270 |
| 7,024,553 | B1* | 4/2006 | Morimoto | 713/163 |
| 7,292,842 | B2* | 11/2007 | Suzuki | 455/411 |
| 2003/0177391 | A1* | 9/2003 | Ofek et al. | 713/201 |
| 2004/0006705 | A1* | 1/2004 | Walker | 713/200 |
| 2004/0078598 | A1* | 4/2004 | Barber et al. | 713/201 |
| 2004/0107366 | A1* | 6/2004 | Balfanz et al. | 713/201 |
| 2004/0203764 | A1* | 10/2004 | Hrastar et al. | 455/435.1 |
| 2005/0015471 | A1* | 1/2005 | Zhang et al. | 709/221 |

OTHER PUBLICATIONS

"Wireless LAN Security", Feb. 6, 2001, Cisco Systems, Inc., http://www.cisco.com/warp/public/cc/pd/witc/ao350ap/prodlit/a350w_ov.htm, accessed Jul. 23, 2007 via web.archive.org.,pp. 1-7.*

Roshan, Pejman, "A Comprehensive Review of 802.11 Wireless LAN Security and the Cisco Wireless Security Suite", Aug. 27, 2002, Cisco Systems, Inc., http://www.cisco.com/warp/public/cc/pd/witc/ao1200ap/prodlit/wswpf_wp.htm, accessed Jul. 23, 2007 via web.archive.org., pp. 1-34.*

(Continued)

*Primary Examiner*—Emmanuel L Moise
*Assistant Examiner*—Jeffery Williams
(74) *Attorney, Agent, or Firm*—Tucker Ellis & West LLP

(57) ABSTRACT

A detection-based defense to a wireless network. Elements of the infrastructure, e.g., access points or scanning-only access points, detect intruders by detecting spoofed frames, such as from rogue access points. Access points include a signature, such as a message integrity check, with their management frames in a manner that enables neighboring access points to be able to validate the management frames, and to detect spoofed frames. When a neighboring access point receives a management frame, obtains a key for the access point sending the frame, and validates the management frame using the key.

4 Claims, 3 Drawing Sheets

OTHER PUBLICATIONS

Convery et al., "Safe: Wireless LAN Security in Depth", Jan. 15, 2002, Cisco Systems, Inc., http://www.cisco.com/warp/public/cc/so/cuso/epso/sqfr/safwl_wp.htm, accessed Jul. 23, 2007 via web.archive.org, pp. 1-52.*

Mishra et al., "An Initial Security Analysis of the IEEE 802.1X Standard", Feb. 6, 2002, University of Maryland, pp. 1-12.*

Arbaugh et al., "Your 802.11 Wireless Network has No Clothes", 2001, University of Maryland, pp. 1-13.*

Gast, Matthew, "802.11 Wireless Networks, The Definitive Guide", Orielly, 2002, chapters 2, 4, 6, 7, and 14.*

Congdon et al., "IEEE 802.1X Radius Usage Guidelines", NWG, p. 1-30.* http://tech-faq.com/wireless-networks/rsn-robust-secure-network.shtml, "What is RSN (Robust Secure Network)?", Sep. 2, 2004.

http://www.eetimes.com/printableArticle.jhtml?doc_id=OEG20021126S0003&_requestid= . . . , "Diving into the 802.11i Spec: A Tutorial", Nov. 26, 2002.

Bernard Aboba, "IEEE 802.1X Pre-Authentication," XP-002339240, Jun. 17, 2002, pp. 1-47.

* cited by examiner

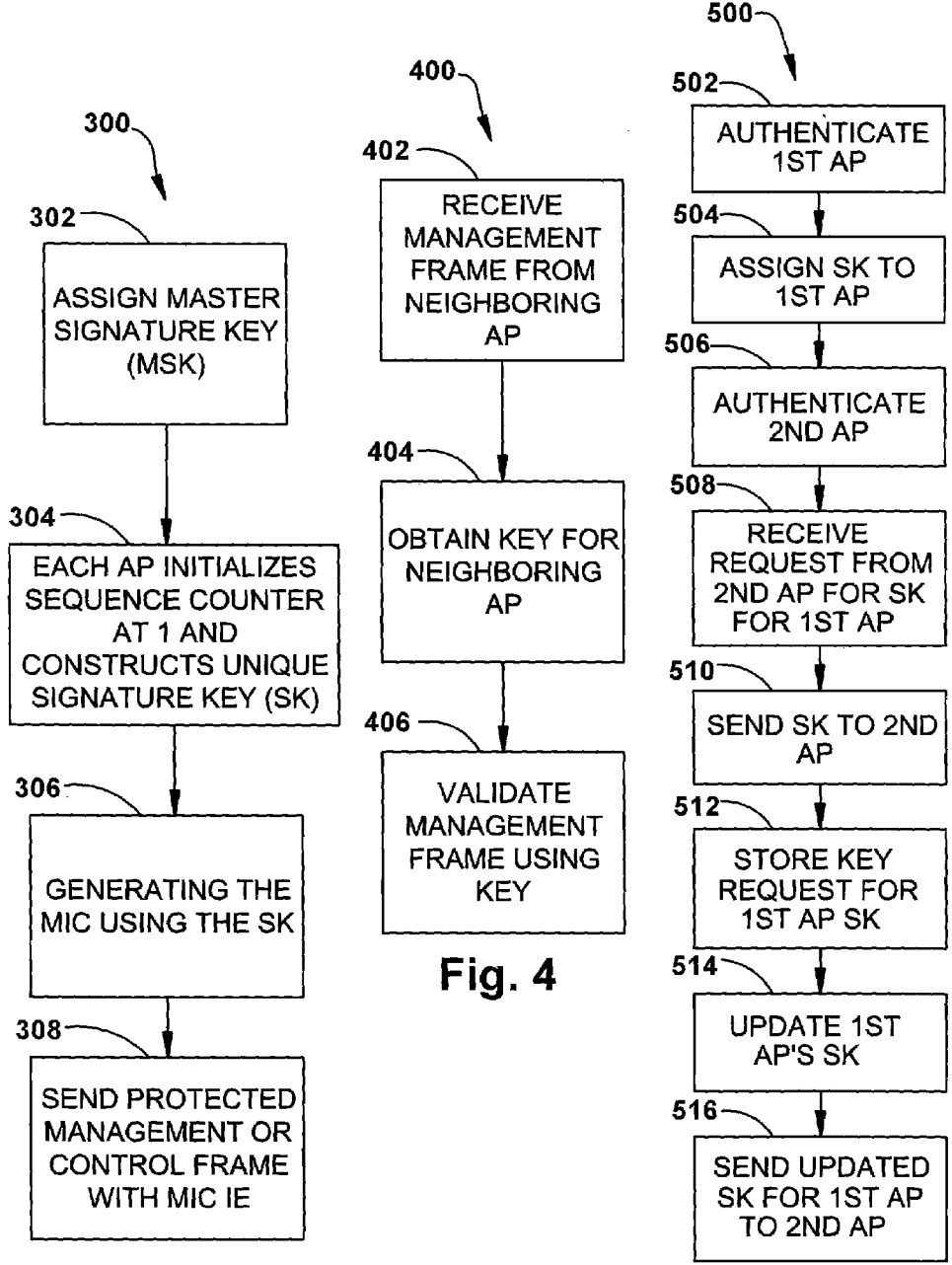

NETWORK INFRASTRUCTURE VALIDATION OF NETWORK MANAGEMENT FRAMES

CROSS-REFERENCE TO RELATED APPLICATIONS

This application is a continuation-in-part of U.S. application Ser. No. 10/687,075, filed on Oct. 16, 2003.

BACKGROUND OF THE INVENTION

The present invention relates generally to wireless local area networks (WLANs) and more specifically to techniques for protecting a wireless network's infrastructure.

The IEEE (institute of Electrical and Electronic Engineers) 802.11 standard provides guidelines for allowing users to wirelessly connect to a network and access basic services provided therein. It has become more evident in recent years that security and controlled access are necessities in light of the large amount of sensitive information that is communicated over networks today.

Traditionally, the security and controlled access efforts have been directed toward protecting the data content of the transmission and not toward the prevention of session disruption. In other words, prior efforts have been directed toward protecting the sensitivity of the content of the data transmitted and not toward the protection of the transmission of management frame packets which control the session integrity and quality.

Of course, access to a network can be restricted by any number of methods, including user logins and passwords, network identification of a unique identification number embedded within the network interface card, call-back schemes for dial-up access, and others. These conventional protection schemes are directed toward controlling the overall access to the network services and toward protecting the data transmissions.

Unfortunately, identifying information contained within the management frames transmitted via a network (e.g. iEEE 802.11 network) has not been the focus of protection in traditional security schemes. U.S. patent application Ser. No. 10/687,075, filed on Oct. 16, 2003, the disclosure of which is hereby incorporated by reference herein, discloses a method for protecting the integrity of network management frames (for example 802.11 management frames) by providing message integrity checks and replay protection within a given security context. However, it does not provide a solution to the specific problem of establishment of the security context. This lack of protection leaves a network vulnerable to attacks whereby an attacker, such as a rogue access point, can spoof Access Point management frames. For example, a rogue access point (AP) can initiate an attack on one or more stations within a network by sending them a spoofed deauthenticate (DEAUTH) or disassociation request, at which point the client will politely disconnect from their original AP and begin to roam, sometimes roaming to the rogue AP which sent the spoofed request.

BRIEF SUMMARY OF THE INVENTION

The present invention is directed to techniques for detection of intruders for a wireless local area network (WLAN). An aspect of the present invention is the monitoring of management frames, from infrastructure nodes, such as an access point (AP) monitoring management frames sent by neighboring access points. Access points provide a message integrity check (MIC) in an information element (IE), e.g., a Management Frame Protection IE (MFP IE) to their management frames in such a way that neighboring access points will be able to validate the authenticity of the message. This enables neighboring access points to detect spoofed frames and distinguish those access points that are unprotected (e.g. they lack the MFP IE. The present invention further contemplates access points configured to implement the methods of the present invention and a computer readable medium of instructions containing means for implementing the methods of the present invention.

An aspect of the present invention is a method for validating network management frames. The method comprises receiving a management frame from an access point, obtaining a key for the access point, and validating the management frame using the key. The present invention further contemplates an apparatus configured to implement the method for validating network frames and computer readable medium of instructions comprising instructions stored thereon for implementing the method for validating network frames.

Another aspect of the present invention is a method for distributing signature keys between access points of a wireless network by a security server. The method comprises authenticating a first access point and authenticating a second access point to the security server. The first access point is assigned a signature key used to protect its management frames. The security server, in response to receiving a request from a second access point for the signature key for the first access point, sends the signature key for the first access point to the second access point. In addition, the security server can store a list of access points requesting keys for the first access point so that when the signature key for the first access point is changed, the security server automatically notifies the access points on the list of the change. The distribution of the signature keys is achieved through a secure mechanism.

In accordance with another aspect of the present invention, the MFP IE is used to determine which access points are "friendly" or valid, which access points are unprotected, and which access points are rogues.

Still other objects of the present invention will become readily apparent to those skilled in this art from the following description wherein there is shown and described a preferred embodiment of this invention, simply by way of illustration of one of the best modes best suited to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrate several aspects of the present invention, and together with the description serve to explain the principles of the invention.

FIG. 3 is a methodology for protecting management frames in accordance with an aspect of the present invention.

FIG. 4 is a methodology for validating a management frame in accordance with an aspect of the present invention.

FIG. 5 is a methodology for distributing a signature key in accordance with an aspect of the present invention.

DETAILED DESCRIPTION OF INVENTION

Throughout this description, the preferred embodiment and examples shown should be considered as exemplars, rather than limitations, of the present invention. The present invention provides a detection-based defense to a wireless network. Elements of the infrastructure, e.g., access points or scanning-only access points or other components (e.g., infrastructure nodes) on the network, detect intruders by detecting spoofed frames, such as from rogue access points. Access points and other elements of the infrastructure include a signature, such as a management frame protection information element (MFP IE), with their management frames in a manner that enables neighboring access points or other network components to be able to validate the management frames, and to detect spoofed frames.

Figures 1, 2:
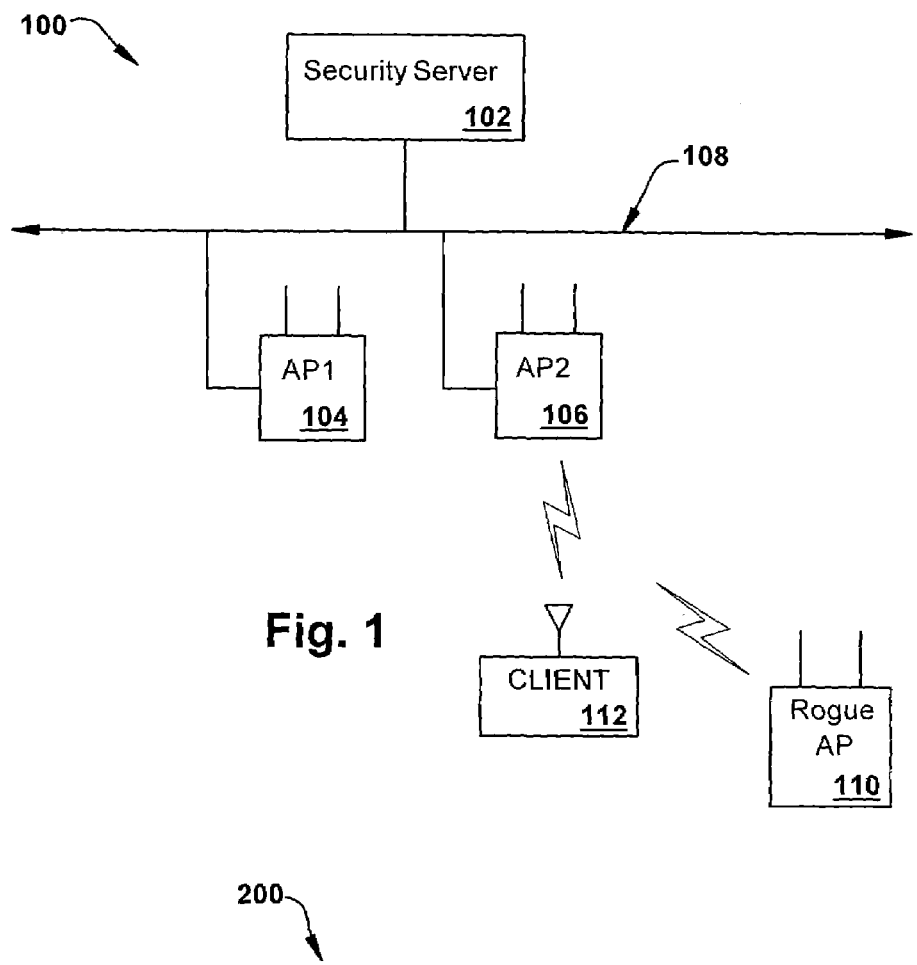
FIG. 1 is a block diagram of a network configured to implement various aspects of the present invention.
FIG. 2 is an example information element for a management frame protection information element (MFP IE) in accordance with an aspect of the present invention.

Referring to FIG. 1, there is illustrated a network 100 in accordance with an aspect of the present invention. The network 100 comprises a security server, such as a wireless domain server (WDS), 102 for performing key management and other security functions on network 100 such as authenticating access points 104, 106 and client 112. A wireless domain server may be suitably adapted to function as security server 102 with the capability to perform the authentication itself, or be coupled to a security server, or authentication server, such as a RADIUS server (not shown), for performing these functions. Access points AP1 104 and AP2 106 are connected to wireless domain server 102 via a secure backbone 108. Backbone 108 comprises at least one of a wired and wireless segment. The example illustrated in FIG. 1, also shows a rogue AP 110. AP2 106 is situated such that it can receive signals sent by AP1 104 and rogue AP 110. However, as will be illustrated herein infra, the present invention does not require that AP 106 needs to be in receiving range of AP 104 to determine whether packets sent by rogue AP 110 are spoofed.

In accordance with an aspect of the present invention, when AP2 106 receives a management frame sent by AP1 104, AP2 106 obtains a key for AP1 104. AP2 106 sends a message on backbone 108 to security server 102 requesting the key for AP1 104. Alternatively, AP1 104, upon being authenticated by security server 102 can send the key to neighboring access points, such as AP2 106, via backbone 108. The management frame is then validated by AP2 106 using the key for AP1 104.

As used herein management frames, such as for an 802.11 network, include but are not limited to beacons, probe requests, probe responses, association responses, disassociation requests, reassociation requests, 802.11 Task Group E (TGe) action frames, 802.11 Task Group h (TGh) action frames, and 802.11 Task Group k (TGk) action frames. The management frame contains an information element (IE), for example an MFP IE, which provides at least a sequence number, a timestamp and a message integrity check (MIC).

FIG. 2 is an example illustration of an information element (IE) for a management frame protection information element (MFP IE) 200 in accordance with an aspect of the present invention. The MFP IE 200 comprises a management frame protection identification (MFP ID) 202 that is 1 byte in length. The MFP ID indicates that the IE is an MFP IE. A length field 204 of 1 byte in length is used to is store the length of the MFP IE 200. A timestamp is stored in the timestamp field 206, which is 4 bytes in length. The timestamp in the timestamp field 206 can be employed for detecting a rogue AP. If a rogue AP rebroadcasts a management frame, or broadcasts a management frame with a copied IE, the timestamp in timestamp field 206 would indicate the frame is an old frame, facilitating the detection of a spoofed or otherwise invalid management frame. A replay counter 208 that is 8 bytes in length is used to store a sequential number to help detect spoofed or otherwise invalid management frames by comparing the sequential number stored in replay counter 208 with the sequential number obtained from previously received packets. If the MFP IE on a management frame is determined to have, the same or lower, sequential number as an earlier MFP IE, then a spoofed or otherwise invalid frame would be indicated. A message integrity check (MIC) is stored in the 8 byte MIC field 210. The inability to validate the data stored in the MIC field 210 using the key for the purported source of the management frame would be indicative of a spoofed or otherwise modified frame.

For example, referring back to FIG. 1 with continued reference to FIG. 2, when AP1 104 sends a management frame, for example a probe response, AP2 106 receives the management frame and using a key that was either obtained from AP1 104 via network 108 or directly from security server 102 and validates the management frame using the key. For example, the key decodes the MFP IE 200 to validate the data in the MIC field 210. In embodiments employing a timestamp and/or sequence counter, AP 106 verifies that the timestamp stored in the timestamp field 206 is not stale, and/or that the sequence number stored in replay counter 208 is not the same as, or lower than, a sequence number received in a previous packet. If AP 106 detects an invalid MIC 210, timestamp 206, and/or replay counter 208, AP 106 generates an alarm. The alarm is suitably in the form of a visual, audio, and/or an automatic notification, such as an email to a system administrator Referring again to FIG. 1, rogue AP 110, in this example, rogue AP 110 is an intruder attempting to pretend to be AP1 104. Rogue AP 110 pretending to be AP1 is 104 sends a management frame, such as a deauthenticate or disassociate message to client 112. If rogue AP 110 sends a deauthenticate or disassociate message to client 112, this has the potential effect of causing client 112 to roam to rogue AP 110. AP2 106, which is in range of rogue AP 110 and capable of receiving signals sent by rogue AP 110, also receives the management frame sent by rogue AP 110. AP2 106 would then attempt to verify the management frame using the key supplied either by AP1 104 or WDS 102 over backbone 108. If the message sent by rogue AP 110 does not have a signature, then AP2 106 determines that the management frame is invalid (e.g., was sent by an intruder). If the message does have a signature, e.g., an MFP IE, then AP2 106 attempts to verify the MIC associated with the message using the key for AP1 104. If the MIC cannot be validated with the key for AP1 104, then AP2 106 determines that the message is invalid (e.g., spoofed or sent by a rogue AP). In addition, if the management frame contains a sequence number or timestamp, these are also be verified by AP2 106.

As AP2 106 detects invalid management frames, AP2 106 generates an alarm. The alarm being at least one of an email to a system administrator (not shown), an auto-dialed message to a system administrator, an alert sent to WDS 102, and/or an audible or visual alarm.

In accordance with an aspect of the present invention, WDS 102 implements a method for distributing signature keys between access points of network 100. It should be noted that a key established as part of the AP to WDS authentication sequence can then be used to secure the key distribution sequence. AP1 104 authenticates with WDS 102. AP2 106 also authenticates with WDS 102. AP2 may authenticate either before, during, or after the authentication of AP1 104. WDS 102 assigns a first signature key to AP1 104. Optionally, WDS 102 assigns a second signature key to AP2 106. WDS 102 in response to a request from AP2 106 for the signature key for AP1 sends the first signature key to AP2 106 enabling AP2 106 to validate messages purported to be originating from AP1 104. Other embodiments of the present invention further contemplate that WDS 102 stores a list of access points requesting the signature key for AP1 104. When WDS 102 updates AP1's 104 signature key, it automatically notifies AP2 106 and, optionally, propagates the updated signature key to any other AP that previously requested AP1's 104 signature key of the update. In embodiments that have AP1 104 distributing the signature key, AP 104 automatically propagates the updated signature key to access points previously requesting the signature key.

Figure 6:
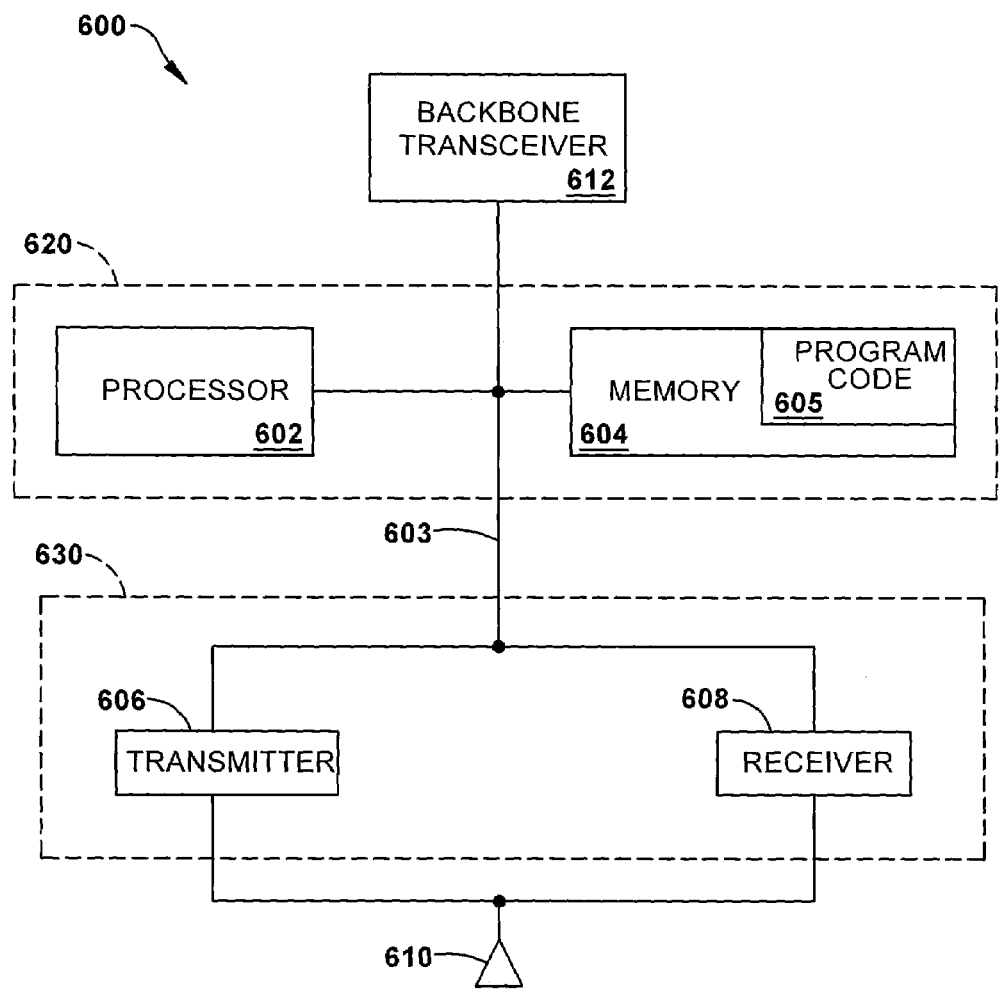
FIG. 6 is a block diagram of an access point that is configurable to implement a methodology in accordance with an aspect of the present invention.

Referring to FIG. 6, there is illustrated an access point 600 that is adaptable to be configured in accordance with the principles of the present invention. The access point 600 comprises a controller 620 and a transceiver 630. Controller 620 comprises a central processing unit (processor) 602, such as a microprocessor, and controls the operation of transceiver 630. Controller 602 is coupled to memory 604 via bus 803. Bus 803 is suitably any type of wired, wireless, or combination of wired and wireless structures capable of transporting data. Memory 604 is any suitable memory for data storage including hard disk, floppy disk, random access memory, or optical storage. A portion of memory 604 contains program code 605 that is used by controller 602. Program code 605 is suitably adapted with computer readable instructions for use by controller 602 to implement the various methodologies described herein. In addition, bus 603 is connected to transmitter 606 and receiver 608 within transceiver 630.

Transceiver 630 comprises transmitter 606, a wireless transmitter. Controller 620 sends data from memory 604, or any other source, to transmitter for wireless transmission via antenna 610.

Transceiver 630 also comprises receiver 608 is a wireless receiver. Data received via antenna 610 is directed to receiver 608, which performs any decoding, and stores the received data in memory 604 or any other suitable location. Although transmitter 606 and receiver 608 are shown as both being connected to antenna 610, in alternative embodiments transmitter 606 and receiver 608 have their own antenna (not shown).

Backbone transceiver 612 is used to communicate with the network (e.g., backbone 108 in FIG. 1). Backbone transceiver 612 is suitably adapted to perform at least one of receive and transmit data, and is used to connect access point 600 to the backbone (not shown) of the network. This enables access point 600 to communicate with other components on the network. For example, when a management frame is received via antenna 610 through receiver 608, processor 602 can send use backbone transceiver 612 to obtain the key to validate the management fame.

In view of the foregoing structural and functional features described above, a methodology in accordance with various aspects of the present invention will be better appreciated with reference to FIGS. 3-5. While, for purposes of simplicity of explanation, the methodologies of FIGS. 3-5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 3 is a methodology 300 for protecting management frames in accordance with an aspect of the present invention. At 302 a master signature key (MSK) is assigned to an AP at the time of AP registration. The key can be updated using a secure protocol, such as WLCCP, available from Cisco Systems, inc., 170 West Tasman Drive, San Jose, Calif., whenever the MSK expires. The expiration period of the MSK is a configurable option. Each AP initializes a sequence counter as 1 and constructs a unique signature key (SK), for example using the method defined by 802.11 Task Group i (TGi):

SK=PRF-128(MSK, key protocol, || BSSID), where key protocol identifies the type of key protocol being used and can be any suitable protocol such as SWAN, Smart Wireless Architecture for Networking, an architecture for radio, network and mobility management within a secure environment, is a proprietary key methodology available from Cisco Systems, inc. The key is then distributed to neighboring access points. The key can be distributed by a central entity that distributes keys such as a WDS or security server, or APs themselves can distribute the keys to neighboring APs using a secure protocol such as WLCCP (described herein supra).

At 306, the AP generates the MIC using the SK. At 308, the AP sends a protected management or control frame with the MIC IE. The MIC IE can be used by itself or be part of an MFP IE for protecting the frame. For example, the AP sends management frames such as beacons, probe/authentication/association requests and responses using a MIC IE or a MFP IE that protects the frames. The MIC IE or an MFP IE can include at least one of a sequence counter, and a timestamp. The sequence counter and/or timestamp increases in order to protect against replay attacks. At this point all neighbor APs, WDSs, or any other security server or distributor of keys can generate keys and start detecting forgeries. APs can advertise this capability either as part of an IE or using proprietary messaging schemes. The present invention is suitably adaptable to protect multicast and unicast frames originating from an access point, and to detect a rogue access point.

FIG. 4 is a methodology 400 for validating a management frame in accordance with an aspect of the present invention. As used herein management frames, such as for an 802.11 network, include but are not limited to beacons, probe requests, probe responses, association requests, association responses, disassociation messages, authentication requests, authentication responses, reassociation requests, reassociation responses, 802.11 Task Group E (TGe) action frames, 802.11 Task Group h (TGh) action frames, and 802.11 Task Group k (TGk) action frames. The management frame contains one or more of an information element (IE), a robust security network information element (RSN IE), and a message integrity check (MIC). At 402 a management frame is received. The management frame can be from any component, such as a neighboring access point, within range.

At 404, a key for the source of the management frame, e.g., a neighboring access point, is obtained. The key is obtained either from a security server, WDS or other key management component on the network, or obtained directly from a neighboring access point via secure communication across a network backbone.

At 406, the management frame is validated using the key obtained in 604. The key is used to decode and validate a signature associated with the management frame, such as a MFP IE or MIC. A management frame that does not have a signature is determined to be invalid. A management that has a signature correctly encoded is deemed valid, otherwise the management frame is deemed invalid. When an invalid management frame is received, preferably an alarm is generated. Other embodiments of the present invention include location determination means for detecting the location of the source of the invalid frame, which is transmitted with the alarm. If the MFP IE or MIC contain a timestamp or sequence number, these are also validated. By using methodology 400, the present invention detects spoofed frames or frames sent by potential intruders to the network.

FIG. 5 is a methodology for distributing a signature key in accordance with an aspect of the present invention. At 502, a first access point (AP) is authenticated on the network. A security server, authentication server, WDS or any component on the network suitably adapted to authenticate network components on the backbone performs the authentication. At 504, the first AP is assigned a signature key (SK).

At 506, a second AP is authenticated on the network. As with the first AP, a security server, authentication server, WDS or any component on the network suitably adapted to authenticate network components on the backbone performs the authentication.

At 508, a request is received from the second AP for the signature key (SK) of the first AP. The request is sent from the first AP to one of a security server, authentication WDS or any component on the network suitably adapted to perform key management and/or distribution. For example, the first AP sends a message to its WDS for the key, which the WDS either sends back, or in the case of a hierarchical network and the first AP belonging to another segment, the WDS obtains the key. Alternatively, the second AP sends a message across the network backbone to the first AP. Preferably, the messages are sent protected (e.g., encrypted) across a secure backbone. At 510, the signature key is sent to the first AP.

At 12, the SK request for the 1st AP's signature key is stored. The stored key request would contain an address or identifier of the entity requesting the SK (e.g., in this example the 2nd AP). At 514, the SK of the 1st AP is updated. Updates are initiated when a SK expires, initiated by a network component, such as a WDS, or by a network administrator. At 516, the updated SK for the 1st AP is sent to the 2nd AP. Furthermore, any other network component that requested the SK for the 1st AP (e.g., that is stored as in step 512) also receives the updated SK. Embodiments of the present invention include sending the key using a secure protocol, such as WLCCP described hereinbefore. The key is sent either by a WDS or other network component responsible for key management and/or distribution or the 1st AP.

In addition to the methodologies described in FIGS. 3-5, the present invention further contemplates a computer readable medium with computer readable instructions thereon for performing the methodologies of FIGS. 3-5. A computer-readable medium is any article of manufacture that contains data that can be read by a computer or a carrier wave signal carrying data that can be read by a computer. For example, the means for defining a plurality of groups of client configurations and means for allocating portions of a network infrastructure to service the groups may be distributed on magnetic media such as a floppy disk, flexible disk, hard disk, reel-to-reel tape, cartridge tape and cassette tape; optical media, such as a CD-ROM, DVD and writeable compact disk; or on a carrier wave signal received through a network, wireless network, or modem including radio-frequency signals and infrared signals or over a wired network (such as an Ethernet).

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A system, comprising:
an authentication server;
a first access point having a wireless transceiver;
a second access point having a wireless receiver that is within range of wireless signals sent by the first access point;
a network coupling the authentication server, the first access point and the second access point;
wherein the second access point establishes an authenticated, secure communication session with the authentication server;
wherein the second access point is responsive to receiving a management frame with a source address corresponding to the first access point to request a key from the authentication server for validating management frames sent by the first access point via the authenticated, secure communication session;
wherein the authentication server is responsive to the request from the second access point to provide the key for the first access point to the second access point via the authenticated, secure communication session;
wherein the second access point is configured to verify the management frame originated from the first access point using the key provided by the authentication server;
wherein the authentication server is configured to maintain a list of access points requesting a key for validating management frames for the first access point;
wherein the second access point is added to the list responsive to requesting the key for validating management frames for the first access point; and
wherein the authentication server is configured to automatically provide an updated key to the second access point responsive to the key for the first access point being updated.

2. The system of claim 1, wherein the authentication server is configured to authenticate the second access point prior to providing the key.

3. The system of claim 1, wherein the second access point is configured to transmit an alarm responsive to receiving a management frame with a source address corresponding to the first access point that fails verification.

4. The system of claim 1, wherein the access point generates an email to a system administrator to receiving a management frame with a source address corresponding to the first access point that fails verification.

* * * * *

UNITED STATES PATENT AND TRADEMARK OFFICE
CERTIFICATE OF CORRECTION

PATENT NO. : 7,558,960 B2  
APPLICATION NO. : 11/029987  
DATED : July 7, 2009  
INVENTOR(S) : Nancy Cam Winget Page 1 of 1

It is certified that error appears in the above-identified patent and that said Letters Patent is hereby corrected as shown below:

Title Page, item 75

Under the Inventors section please replace the name of the second Inventor (line 2) as follows:

--Mark Krischer--

Signed and Sealed this
Twenty-fifth Day of September, 2012

David J. Kappos
*Director of the United States Patent and Trademark Office*